United States Patent [19]
Giddey et al.

[11] 4,039,694
[45] Aug. 2, 1977

[54] PROCESS FOR PRODUCING A PROTEIN-BASED FOOD

[75] Inventors: Claude Giddey; Willy Rufer, both of Geneva, Switzerland

[73] Assignee: Battelle Memorial Institute, Carouge, Switzerland

[21] Appl. No.: 711,087

[22] Filed: Aug. 2, 1976

Related U.S. Application Data

[63] Continuation-in-part of Ser. No. 576,421, May 12, 1975, abandoned, which is a continuation-in-part of Ser. No. 277,589, Aug. 2, 1972, abandoned.

[30] Foreign Application Priority Data

Aug. 3, 1971  Switzerland ...................... 11362/71

[51] Int. Cl.$^2$ ............................................. A23J 3/00
[52] U.S. Cl. ................................... 426/574; 426/656; 426/657; 426/802
[58] Field of Search ............... 426/574, 576, 656, 657, 426/601, 613, 802

[56] References Cited

U.S. PATENT DOCUMENTS

| | | | |
|---|---|---|---|
| 2,813,024 | 11/1957 | Anson et al. | 426/574 |
| 2,813,025 | 11/1957 | Anson et al. | 426/104 |
| 2,830,902 | 4/1958 | Anson et al. | 426/89 |
| 3,644,121 | 2/1972 | Boyer et al. | 426/802 X |
| 3,711,291 | 1/1973 | Leidy et al. | 426/574 |
| 3,741,774 | 6/1973 | Burkwall | 426/656 X |
| 3,836,678 | 9/1974 | Leidy et al. | 426/656 X |

Primary Examiner—Raymond N. Jones
Assistant Examiner—Esther L. Massung

[57] ABSTRACT

A protein food product having a general appearance, taste, nutritional properties similar to those of dried meat and having also a cracked texture similar to the fibrous texture of dried meat is produced by partially dehydrating a homogeneous mass of aqueous vegetable protein gel.

7 Claims, No Drawings

PROCESS FOR PRODUCING A PROTEIN-BASED FOOD

BACKGROUND OF THE INVENTION

The present appliation is a continuation-in-part of our application Ser. No. 576,421, filed May 12, 1975 now abandoned, which is a continuation-in-part of application Ser. No. 277,589 filed Aug. 2, 1972, now abandoned.

FIELD OF THE INVENTION

This invention relates to a process for producing a protein-based food product having an appearance and texture analogous to the fibrous texture of dried meat.

This food can be presented in various forms with an appearance, consistency and organoleptic properties similar to those of delicatessen products, for example, dried meat, Parma ham, dry sausage, pickled fish, fresh fish, etc.

DESCRIPTION OF THE PRIOR ART

There are at present three main processes for producing foods resembling various types of meat. In the first of these processes, a mixture of gluten, flour, fat and other less important ingredients is coagulated by heating in a hermetically sealed container. Unfortunately, the product thus obtained bears no real similarity to meat.

In the second process, a solution of proteins is injected into a coagulating bath so as to form fibres, and the fibres thus obtained stretched and washed in order to remove from them constituents of the coagulating bath. These fibres are then bonded together by means of a suitable binder and, finally are colored and aromatized. The product thus obtained is preserved either as such in a refrigerated state or in dry form. The disadvantage of this process is that it is extremely complicated and delicate to carry out with the result that the retail price of the artificial meat thus obtained is higher than that of natural meat.

The third process, known as the cooking extrusion process, comprises baking a mass of suitably aromatized soya flour in the presence of water so as to hydrate it. The paste thus obtained is then extruded by means of a screw extruder in which it is subjected to a pressure of several tens of atmospheres and to a temperature ranging from 100° to 150° C. On leaving the extruder, the mass expands while at the same time developing a cellular structure. The product thus obtained is cut into pieces of the required shape and size and then dried. The product obtained by this process has a spongelike structure resembling that of a minced meat. This product is known commercially as textured vegetable protein, but in practice can only be consumed in admixture with a certain quantity of natural meat. The advantage of this process over the second of the three aforementioned processes is that it is extremely direct, but involves the disadvantage of necessitating the use of heavy, expensive extruders.

It has also been proposed (U.S. Pat. No. 2,830,903 to Anson and Pader) to manufacture a protein-based food product which is similar in texture to meat or meat-based foods and which is in the form of a coherent, heterogeneous mass consisting of at least two phases, namely, on the one hand, separate, heat-stable and non-stretched particles of a gel based on a hydrated, non-oriented protein substance and, on the other hand, at least one phase formed from ingredients which are not part of this gel.

The process by which this product is produced has the disadvantage of being difficult to carry out on account of the delicate operations required to obtain a heterogeneous end product.

Burkwall, U.S. Pat. No. 3,759,714 discloses a protein food product and a process for producing said product. Said process comprises mixing specified amounts of flavoring agent, such as honey, peanut butter or chocolate; sugar and/or sugar equivalents; pregelatinized starch; high protein binding agent such as soy flour, casein, albumin, whey, non-fat milk solids, cereal proteins or oilseed proteins; and water, and forming the mixture into the shape of a food product.

Said food product forms a plastic mass containing at least from 20 to 25 percent by weight protein (i.e. total amount of animal and vegetable protein) and from 20 to 40 percent by weight water.

Although said food product is supposed to be a highly nutritious and high protein containing product, it cannot be considered as a substitute for meat or meat products of the kind specified above not only because of the nature of its flavouring ingredients, but also because it lacks the fibrous texture of meat.

SUMMARY OF THE INVENTION

The object of the present invention is to produce a protein-based food product consisting of a homogeneous gel having a high vegetable protein content, preferably of at least 30% by weight, and a water content between 15% and 35% by weight, said gel having a cracked texture similar to the fibrous texture of dried meat.

Said texture is obtained by partial dehydration of a homogeneous coagulated mass having a water content between 35% and 80% by weight.

Said protein-based food product is intended to be consumed preferably as such without any need for cooking, rehydration or other preparation, and being produced by a process that is simpler, and by means of machinery that is less complicated, than the processes for producing meat substitutes referred to earlier.

To this end, the process according to the invention comprises the steps of:

a. forming a homogeneous mixture consisting essentially of an aqueous suspension of at least one isolated vegetable protein and of at least one other ingredient, selected from carbohydrates and lipides and adjusting the amounts of the ingredients of said mixture to, respectively, from 15 percent to 30 percent by weight of isolated vegetable protein, at most 15 percent by weight of carbohydrate and at most 20 percent by weight of lipide, the total amount of carbohydrate and lipide being comprised between 5 percent and 35 percent, and from 35 to 80 percent by weight of water and the pH of the mixture to a value between 5.7 and 6.4, so as to form a homogeneous heat gelable mass, b. heating said mass to a temperature in the range from 60° C to 160° C, for a period of time sufficient to coagulate the isolated vegetable protein, so as to transform the mass into a homogeneous gel and, c. reducing the water content of the thus obtained homogeneous gel to between 15 percent and 35 percent by weight, such that the ratio of the water content of the final product to the water content of the starting mixture is between about 1:4.1 to about 1:2.7, the water content being reduced at a sufficient rate to provoke the formation of cracks in said gel so as to confer the final product an appearance and texture analogous to the fibrous texture of dried meat.

In order to adjust the degree of acidity of the mixture before gelling, it is possible to adjust the pH-value of the isolated protein or of the mixture as a whole.

It is preferred to use seeds of oleaginous or leguminous plants as the vegetable protein source. The following plants are mentioned by way of example: peanut, turnsole, rapeseed, soya, cotton, pea and lupin plants. Soya protein isolated at the isoelectric point at a pH-value adjusted to 5.9 and converted into a fine, dry powder by spray-drying, is particularly suitable for use as the protein substance.

The dietetic properties of the product can be varied by incorporating at least one protein substance of animal origin in the mixture. Examples of suitable animal proteins include casein, meat meal and fish meal, etc. The maximum quantity in which the animal protein can be incorporated in the mixture is approximately 30% by weight based on the total weight of said homogeneous mixture. Beyond this quantity, the product will not gel and the consistency of the product obtained is unsatisfactory.

Any edible animal or vegetable fat can be used as the lipide in a maximum proportion of at most 20% by weight of said homogeneous mixture.

Examples of suitable carbohydrates include monosaccarides such as, for example, glucose, saccarose and lactose and/or di- and tri-saccarides. The maximum quantity of carbohydrate which can be used corresponds to a proportion of at most 15% by weight of said homogeneous mixture.

In order to provide the product with suitable organoleptic properties, various aromatics, colorants, spices and mineral or organic salts can be incorporated in the mixture before gelling. For example, pepper, cinnamon, vanilla, etc., can be used as spices, while sodium chloride, sodium glutamate, etc can be used as salts. The quantities in which these ingredients are used will, of course, depend upon their type and upon the intensity of the organoleptic property which it is desired to obtain.

Depending upon the choice of the aromatics, spice, colorants and other substances referred to above, it is possible to obtain products differing widely in flavor, odor and color. For example, although the texture of this product makes it similar to products obtained by the transformation of meat and to delicatessen products and although it is preferably aromatized and colored accordingly, it is possible to provide it with a different flavor for example with the flavor of cheese.

In order to provide the product with a certain degree of elasticity and also to increase its water-retention capacity, it is possible to incorporate in the mixture before it is gelled a quantity of gelatin corresponding to a content of from 1 to 4% of the weight of the said homogeneous mixture, or even a quantity of an edible hydrophilic agent, for example a polyalcohol such as glycerin, D-sorbitol (sorbitol), optionally in the form of syrup of sorbitol, corresponding to a content of from 1.4 to 5% of the weight of said homogeneous mixture.

In order to stabilize the gel, above all when the mixture contains a large quantity of fat, and also to improve the water-retention capacity of the product and to facilitate incorporation of the various ingredients of the mixture in homogeneous form, various salts of food-grade tribasic or polybasic acids can be incorporated in the mixture before it is gelled. For example, it is possible to use for this purpose the sodium salts of citric acid or of pyrophosphoric, metaphosphoric or polyphosphoric acid, especially disodium pyrophosphate, tetrasodium pyrophosphate and sodium pentapolyphosphate, these salts being used individually or in admixture with one another.

It is also possible to use other substances capable of improving the homogeneity of the product, for example palm-based sucroglycerides, monoglycerides, soya lecithin, etc.

In order to facilitate gelling in cases where a vegetable protein substance which does not gel very easily underheat is used, it is possible to incorporate in the mixture intended to form the gelable mass certain gelling agents specific to proteins, for example carrageenates.

The process according to the invention can be carried out as follows:

The paste is formed by thoroughly mixing the various constituent ingredients of the product at or around ambient temperature and by introducing each of the ingredients preferably in the order in which a high degree of homogeneity is most easily obtained in the paste. To this end, the water and the ingredients readily soluble or dispersible in water are preferably mixed together first of all, after which the vegetable protein is dispersed with vigorous stirring in the solution or dispersion thus obtained and, finally, the fat is incorporated in the mixture so as to form an homogeneous emulsion.

If necessary, the mixture can be homogenized by subjecting it to a suitable treatment in a piston-type homegenizer.

The heat treatment intended to form a gel from the gelable mass comprises heating to a temperature and for a period of time suitable for provoking the coagulation of the isolated vegetable protein. The range of suitable temperature level is governed, above all, by the type of vegetable protein and its proportion in the mixture and to, a lesser extent, by the nature of the other ingredients.

This temperature is preferably in the range from 60° to 160° C. Any suitable method of heating can be used for coagulating the heat gelable mass, for example, heating in an oven or by means of a hot fluid such as hot water or steam or microwave heating, especially by means of waves with a frequency of from 915 to 2450 Mc/s. Coagulating of the heat gelable mass can be carried out intermittently, in which case the mass is either kept at atmospheric pressure or is heated in a hermetically sealed container, for example, in a crimped-rim metal can or in an autoclave. The heat gelable mass can also be coagulated continuously, for example by spreading it over a surface such as a metal belt, a rotating cylinder, etc., this surface being heated to a suitable temperature, or by passing it through a continuous heat exchanger equipped with a thin-layer scraper so as to obtain the gel in a form particularly suitable for drying.

It is also possible, in order to obtain a homogeneous gel, to heat the gelable mass while subjecting it to agitation so as to ensure homogeneous distribution of temperature, and then to bring the mass into a compact form by stopping the agitator and transferring the mass into a suitably shaped mould under a light pressure, for example of the order of 1 kg/cm², and finally to leave the mass to cool in this mould.

In order to reduce the water content of the gel, the gel can be progressively dried, for example by exposing it over a period of from 5 to 48 hours, to air with a temperature of from 10° to 50° C and with a relative humidity of from 70 to 80%. This operation can be carried out in a smoking chamber of the kind normally used for curing foods.

The gel can also be dried more quickly, but still progressively, by internal microwave heating, more particularly by means of waves with a frequency of from 915 to 2450 Mc/s. By applying this method of heating, it is possible to increase the internal tension in the product and to form friable zones therein. It is possible in this way to obtain a food with the appearance and the organoleptic properties of ham or fried bacon, but without their high fat content. In order to facilitate drying, the gel can be cut into thin slices, for example with a thickness of from 0.5 to 2 mm and a surface area of at least 10 cm$^2$, before it is dried. However, it is also possible to dry the gel in the form of large blocks and to cut the product into pieces of the required shape and size, preferably within the limits specified above, after drying. As already mentioned, the semi-dry product thus obtained corresponds to the normal form in which this food is consumed. By contrast, a protein-based food produced under the conditions described in the aforementioned U.S. Patent does not lend itself to consumption in dehydrated form. The product manufactured by the process according to the invention constitutes a polyvalent dietetic food by virtue of the fact that its consumption can be varied within wide limits. Its content of proteins of high biological value is relatively high while its fat content and the nature of the fats present can be fixed as required within fairly wide limits.

DESCRIPTION OF THE PREFERRED EMBODIMENTS

EXAMPLE 1

A plastic paste is prepared from the following ingredients (quantities expressed in % of weight):

| | |
|---|---|
| water | 60.50 |
| dried whey* | 3.56 |
| gelatin | 1.07 |
| sodium chloride | 3.56 |
| sodium glutamate | 1.78 |
| powdered soya protein (isolated by extraction at the isoelectric point at pH 5.9 after isolation and spray drying to form a fine, dry powder) | 17.80 |
| edible fat (hydrogenated peanut oil with a melting point of 40° C) | 7.10 |
| glycerin | 1.42 |
| Fondagil (registered trade mark in the name of Progil for a mixture of disodium pyrophosphate tetrasodium pyrophosphate and sodium pentapolyphosphate) | 0.97 |
| edible flavoring | 1.64 |
| colorant | 0.25 |
| pepper | 0.35 |
| *The composition of the dried whey is the following (in percent by weight): | |
| proteins (lactalbumin and lactoglobulin) | 12.0 |
| fats | 1.2 |
| carbohydrates (lactose) | 71.5 |
| mineral salts (calcium phosphate, sodium phosphate and potassium phosphate) | 8.0 |
| water | 7.1 |
| vitamins (A and B$_1$) | 0.2 |

This paste is prepared as follows:

The powdered whey, the gelatin, the sodium chloride, the sodium glutamate, the glycerin, the Fondagil and the colorant, are dissolved in water at ambient temperature. The soya protein is then incorporated in the aqueous solution thus obtained with vigorous stirring in order to quickly disperse the protein powder. The edible fat is then incorporated in the suspension thus obtained in the form of a melt containing the edible flavoring, stirring of the mixture being continued so as to form an emulsion. This emulsion is then homogenized in a piston-type homogenizer to form a semi-fluid paste. The paste thus obtained is introduced into cylindrical metal cans with a diameter of 75 mm and a height of 60 mm which are hermetically sealed by crimping after they have been completely filled with the paste. The cans are then heated to 110° C over a period of 20 minutes, after which they are opened and the mixture, which now has the consistency of gelled blocks, removed from them. These blocks are cut into 1 mm thick slices which are dried by exposure for 5 hours to a stream of hot air with a temperature of 40° C. Drying is stopped when the water content of the product is between 15 and 20% by weight. The product thus obtained is stable at ambient temperature and can be stored for several weeks without alteration in the absence of any particular precautions. This product contains 36% by weight isolated vegetable protein when its water content is of 20% by weight and 38.30 by weight isolated vegetable protein when its water content is of 15% by weight.

EXAMPLES 2 TO 4

One proceeds according to the manner disclosed in Example 1, but starting from the ingredients indicated in the following table (in which the quantities are expressed in % by weight):

| | Example 2 | Example 3 | Example 4 |
|---|---|---|---|
| water | 60.5 | 60.5 | 60.5 |
| sodium chloride | 3.56 | 3.56 | 3.56 |
| sodium glutamate | 1.78 | 1.78 | 1.78 |
| powdered soya protein isolated at its isoelectric point | 17.8 | 21.43 | 24.9 |
| edible fat (hydrogenated peanut oil with a melting point of 40° C) | 7.1 | 7.1 | — |
| Maize starch | 3.63 | — | 3.63 |
| Agar-Agar | 1.0 | 1.0 | 1.0 |
| glycerin | 1.42 | 1.42 | 1.42 |
| Fondagil | 0.97 | 0.97 | 0.97 |
| edible flavoring | 1.64 | 1.64 | 1.64 |
| colorants | 0.25 | 0.25 | 0.25 |
| ground pepper | 0.35 | 0.35 | 0.35 |

The obtained products are similar to the product which is obtained according to Example 1.

EXAMPLE 5

A mixture with the following composition (expressed in % by weight) is prepared in the same way described in Example 1:

| | |
|---|---|
| water | 63.0 |
| powdered soya protein isolated at its isoelectric point | 18.63 |
| dry whey | 3.7 |
| gelatin | 1.1 |
| sodium chloride | 1.85 |
| cocoa fat | 7.42 |
| glycerin | 1.5 |
| sodium sorbate | 0.1 |
| "Fondagil 6"$^R$ | 0.43 |
| "Fondagil 10" $^R$ | 0.43 |
| "Fondagil 12" $^R$ | 0.16 |
| ("Fondagil 6", "Fondagil 10" and "Fondagil 12" are trade marks used by the Progil Company for mixtures of disodium pyrophosphate, tetrasodium pyrophosphate and sodium pentypolyphosphate) | |
| colorants | 0.03 |

| | |
|---|---|
| caramel | 0.15 |
| edible flavoring | 1.2 |
| monosodium phosphate (NaH$_2$PO$_4$) | 0.3 |

This mixture is homogenized as described in Example 1. A gelable mass is thus obtained in the form of a perfectly homogeneous, semi-fluid paste with a water content of 63% by weight.

A 2 kg batch of this paste is introduced into a mould and heated for 90 minutes to 85° C by immersing the mould in a bath of hot water. The gel block thus obtained is then removed from the mould and dried for 48 hours in air of 70% relative humidity at a temperature of 11° C. Thereafter, the block is kept in a smoking chamber for 48 hours at 20° C and, finally, for 48 hours at 11° C in a drying cabinet filled with air of 78% relative humidity.

The product thus obtained is in the form of a homogeneous block with extremely good elasticity and a water content of 23.2%, and an isolated vegetable protein content of 38.7% very similar to a piece of partially dried beef of the "viande des Grisons" type. This block can be cut into thin transparent slices in exactly the same way as a block of natural "viande des Grisons".

EXAMPLE 6

The procedure as in Example 2, except that the gelable mass is heated for 3 minutes in a microwave oven regulated to a frequency of 2450 Mc/s, and then for 45 minutes in a water bath heated to 85° C.

EXAMPLE 7

The procedure is as in Example 2, except that, instead of being introduced into a mould, the gelable mass is introduced into sausage casings. The gelable mass enclosed in the casings is heated for 90 minutes to 85° C, in a bath of hot water, to provoke gelification of said mass. Then, without removing the gelled mass, which is thus obtained, from the sausage casings, the casings are kept in a smoking chamber for 48 hours, at 20° C, and then for 7 days at 11° C, in a drying cabinet filled with air of 78% relative humidity.

A product very similar to beef sausage is obtained in this way.

EXAMPLE 8

The procedure is as in Example 2, except that, after the homogeneous gelable mass has been obtained, it is subjected to a heat treatment in batches of approximately 2 kg in a mixer heated by steam under a relative pressure of 1.6 atmospheres.

The mass, still in a semi-fluid state, is then put into shape without being allowed to cool by introducing it into moulds under a pressure of around 1 kg/cm$^2$.

The mass is then allowed to gel by cooling in the moulds, after which the gel is removed from the mould and subjected to the smoking and drying treatment described in Example 4.

EXAMPLE 9

The procedure is as in Example 2 except that, after the homogeneous gelable mass has been oriented, it is passed downwards between two rotating hollow steel cylinders with parallel axes which are 16 cm in diameter and 15 cm wide, leaving a 1 mm wide gap between them. These cylinders are heated internally with steam (input pressure = 3 bars, which corresponds to an outer surface temperature of the cylinders of 130°–135° C) and rotate in opposite directions at a speed of 1 revolution every 45 seconds. (Contact time of the gelable mass with the cylinders: 30 seconds).

The gel obtained in this way is in the form of an approximately 1 mm thick strip with a water content of around 50 to 55%.

A sufficient number of these strips is then introduced into a mould and kept therein for 12 hours under slight pressure, at a temperature of 5° C. Then, the coherent block which is thus obtained is introduced into a sausage casing and dried for 3 weeks in air of 70% relative humidity and a temperature between 5° and 10° C.

EXAMPLES 10 TO 12

The procedure is as in Example 2, but with the following variations in the composition of the mixture.

Example 10 : the monosodium phosphate is omitted.

Example 11 : sodium chloride is used in a quantity of 50 parts as opposed to 25 parts.

Example 12 : monosodium phosphate is replaced by 4 parts of monocalcium phosphate caHPO$_4$.

The products obtained in accordance with these three Examples are similar to the product obtained in accordance with Example 2.

What we claim is:

1. A process for producing a protein-based food product comprising the steps of:
   a. forming a homogeneous mixture consisting essentially of an aqueous suspension of at least one isolated vegetable protein and of at least one other ingredient, selected from carbohydrates and lipides, and adjusting the amounts of the ingredients of said mixture to, respectively, from 15 percent to 30 percent by weight of isolated vegetable protein, at most 15 percent by weight of carbohydrate and at most 20 percent by weight of lipide, the total amount of carbohydrate and lipide being between 5 percent and 35 percent, and from 35 to 80 percent by weight of water, and the pH of the mixture to a value between 5.7 and 6.4, so as to form a homogeneous heat gelable mass,
   b. heating said mass to a temperature in the range from 60° C to 160° C, for a period of time sufficient to coagulate the isolated vegetable protein, so as to transform the mass into a homogeneous gel and,
   c. reducing the water content of the thus obtained homogeneous gel to between 15 percent and 35 percent by weight, such that the ratio of the water content of the final product to the water content of the starting mixture is between about 1:4.1 to about 1:2.7, the water content being reduced at a sufficient rate to provoke the formation of cracks in said gel so as to confer to the final product an appearance and texture analogous to the fibrous texture of dried meat.

2. A process as claimed in claim 1, wherein gelling of the mass is carried out continuously.

3. A process as claimed in claim 2, wherein the gelable mass is heated in a thin layer on a heated surface and the gelled mass is continuously removed from said surface.

4. A process as claimed in claim 3, wherein said heated surface is that of a rotating cylinder.

5. A process as claimed in claim 1, wherein the gelable mass is heated while stirring so as to ensure homogeneous distribution of its temperature, and this mass is then brought into a compact form by switching off the stirrer and transferring the mass into a mould under a pressure of around 1 kg/cm² and the mass allowed to cool.

6. A process as claimed in claim 1, wherein at least one animal protein substance is added to the said homogeneous mixture in a proportion at most equal to 30% of the total weight of this mixture.

7. A process as claimed in claim 6, wherein said animal protein substance is selected from the group consisting of casein, meat meal and fish meal.

* * * * *